United States Patent
Kikuchi

(10) Patent No.: US 8,136,617 B2
(45) Date of Patent: Mar. 20, 2012

(54) POWER OUTPUT APPARATUS AND HYBRID VEHICLE EQUIPPED WITH THE SAME

(75) Inventor: Yoshiaki Kikuchi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 518 days.

(21) Appl. No.: 11/628,032

(22) PCT Filed: Jun. 3, 2005

(86) PCT No.: PCT/JP2005/010626
§ 371 (c)(1),
(2), (4) Date: Nov. 30, 2006

(87) PCT Pub. No.: WO2005/118322
PCT Pub. Date: Dec. 15, 2005

(65) Prior Publication Data
US 2007/0240922 A1     Oct. 18, 2007

(30) Foreign Application Priority Data

Jun. 4, 2004 (JP) .................................. 2004-167432

(51) Int. Cl.
*B60W 10/24* (2006.01)
*B60W 10/06* (2006.01)

(52) U.S. Cl. ........... 180/65.29; 180/65.265; 180/65.275; 180/65.28; 180/65.285; 903/903; 903/904; 903/905; 903/907

(58) Field of Classification Search ................. 180/65.1, 180/65.2, 65.3, 65.4; 903/903, 906, 907, 903/921, 922, 924, 926, 930, 940, 941, 942, 903/943, 947
See application file for complete search history.

(56) References Cited

U.S. PATENT DOCUMENTS

| | | | | |
|---|---|---|---|---|
| 4,187,436 A * | 2/1980 | Etienne | ............................ | 290/27 |
| 5,359,308 A * | 10/1994 | Sun et al. | ....................... | 335/216 |
| 5,558,595 A | 9/1996 | Schmidt et al. | | |
| 5,788,597 A * | 8/1998 | Boll et al. | ........................... | 477/4 |
| 5,844,342 A * | 12/1998 | Miyatani et al. | .............. | 310/114 |
| 5,905,346 A * | 5/1999 | Yamada et al. | .................. | 318/50 |
| 6,742,487 B2 * | 6/2004 | Yamaguchi et al. | ........ | 123/179.3 |
| 2002/0107632 A1 * | 8/2002 | Fuse et al. | ...................... | 701/112 |
| 2003/0052650 A1 * | 3/2003 | Gunji | ............................ | 320/155 |
| 2003/0088343 A1 | 5/2003 | Ochiai et al. | | |
| 2004/0046394 A1 * | 3/2004 | Lim | ............................ | 290/40 C |
| 2005/0139400 A1 * | 6/2005 | Gee | ............................. | 180/65.2 |
| 2006/0180363 A1 * | 8/2006 | Uchisasai et al. | ............ | 180/65.2 |

FOREIGN PATENT DOCUMENTS

DE    EP 0570241 A1 * 11/1993

(Continued)

*Primary Examiner* — Hau Phan
*Assistant Examiner* — Bryan Evans
(74) *Attorney, Agent, or Firm* — Kenyon & Kenyon LLP

(57) ABSTRACT

During an operation of an engine, an input limit Swin and an output limit Swout of a battery are set to a power demand-based input limit Wp*, which depends on a power demand P*, and to an accelerator opening-based output limit Wacc, which depends on an accelerator opening Acc (steps S400 to S420). This control technique effectively prevents the battery from being frequently charged or discharged to a relatively high level of electric power within an allowable electric power range defined by the reference input limit Bwin and the reference output limit Bwout, thus restraining premature deterioration of the battery.

17 Claims, 11 Drawing Sheets

FOREIGN PATENT DOCUMENTS

| | | |
|---|---|---|
| DE | 195 39 571 A1 | 4/1997 |
| DE | 44 46 485 C2 | 6/2003 |
| DE | 103 46 720 A1 | 5/2004 |
| EP | 0 570 241 A1 | 11/1993 |
| EP | 0570241 A1 * | 11/1993 |
| EP | 570241 A1 * | 11/1993 |
| EP | 0 909 675 A2 | 4/1999 |
| EP | 1 452 375 A2 | 9/2004 |
| JP | 11-187577 | 7/1999 |
| JP | 2003-092804 A | 3/2003 |
| WO | WO 2004/030970 A2 | 4/2004 |

* cited by examiner

POWER OUTPUT APPARATUS AND HYBRID VEHICLE EQUIPPED WITH THE SAME

This is a 371 national phase application of PCT/JP2005/010626 filed 3 Jun. 2005, claiming priority to Japanese Patent Application No. JP 2004-167432 filed 4 Jun. 2004, the contents of which are incorporated herein by reference.

FIELD OF THE INVENTION

The present invention relates to a power output apparatus, a hybrid vehicle equipped with the power output apparatus, and a control method of the power output apparatus.

BACKGROUND OF THE INVENTION

One proposed power output apparatus sets an input limit and an output limit of a secondary battery according to the observed conditions of the secondary battery (see, for example, Japanese Patent Laid-Open Gazette No. 11-187577). The prior art apparatus sets the input limit and the output limit of the secondary battery according to the observed temperature and the current state of charge of the secondary battery, and drives a motor and a generator within a range of the input limit and the output limit. This prohibits the secondary battery from being charged and discharged to an excessively high level of electric power and prevents deterioration of the secondary battery.

SUMMARY OF THE INVENTION

The prohibition of the charge and discharge of the secondary battery to the excessively high level of electric power certainly prevents deterioration of the secondary battery. Even within a range of the input limit and the output limit set according to the observed conditions of the secondary battery, however, frequent charge and discharge of the secondary battery may accelerate deterioration of the secondary battery.

A power output apparatus, a hybrid vehicle equipped with the power output apparatus, and a control method of the power output apparatus of the invention thus aim to prevent premature deterioration of an accumulator unit, such as a secondary battery, incorporated in the power output apparatus. The power output apparatus, the hybrid vehicle equipped with the power output apparatus, and the control method of the power output apparatus of the invention also aim to ensure output of a required power to a drive shaft.

At least part of the above and the other related objects is attained by a power output apparatus, a hybrid vehicle equipped with the power output apparatus, and a control method of the power output apparatus of the invention having the configurations discussed below.

The present invention is directed to a power output apparatus that outputs power to a drive shaft, and the power output apparatus includes: an internal combustion engine; a power conversion mechanism that converts at least part of output power of the internal combustion engine into electric power; a motor that outputs power to the drive shaft; an accumulator unit that transmits electric power to and from the power conversion mechanism and the motor; an input output limit setting module that sets at least either of an input limit and an output limit of the accumulator unit, as a lower limit and an upper limit of an allowable electric power range input from and output to the accumulator unit, based on an operation or a stop of the internal combustion engine; a power demand specification module that specifies a power demand to be output to the drive shaft; and a control module that controls the internal combustion engine, the power conversion mechanism, and the motor to output a required power corresponding to the specified power demand to the drive shaft while to keep the input limit and the output limit of the accumulator unit.

The power output apparatus of the invention sets at least either of the input limit and the output limit of the accumulator unit based on an operation or a stop of the internal combustion engine. The power output apparatus controls the internal combustion engine, the power conversion mechanism, and the motor to output a required power corresponding to a specified power demand to the drive shaft while to keep the input limit and the output limit of the accumulator unit. Here the power conversion mechanism and the motor are respectively designed to convert at least part of output power of the internal combustion engine into electric power and to output power to the drive shaft. Namely the power output apparatus of the invention keeps the input limit and the output limit of the accumulator unit, which are based on the operation or the stop of the internal combustion engine, while outputting the required power to the drive shaft. The structure of the invention ensures adequate charge and discharge of the accumulator unit, compared with the prior art structure that does not set the input limit or the output limit of the accumulator unit based on the operation or the stop of the internal combustion engine. This arrangement effectively restrains premature deterioration of the accumulator unit, while ensuring output of a required power corresponding to a specified power demand to the drive shaft.

In the power output apparatus of the invention, the input output limit setting module may set at least either of the input limit and the output limit to narrow the allowable electric power range during an operation of the internal combustion engine, compared with the allowable electric power range during a stop of the internal combustion engine. This arrangement effectively reduces the charge and discharge levels of the accumulator unit during the operation of the internal combustion engine, thus desirably restraining premature deterioration of the accumulator unit. In this case, the input output limit setting module may set at least either of the input limit and the output limit according to an observed condition of the accumulator unit during a stop of the internal combustion engine, and may set at least either of the input limit and the output limit during an operation of the internal combustion engine to keep temperature of the accumulator unit at or below a preset reference level within an allowable temperature range under the condition of continuous charge or continuous discharge of the accumulator unit. This arrangement effectively prevents a temperature rise of the accumulator unit during the operation of the internal combustion engine, thus desirably restraining premature deterioration of the accumulator unit.

In the power output apparatus of the invention, the input output limit setting module may set at least either of the input limit and the output limit on the assumption of a stop of the internal combustion engine until elapse of a preset time period from a start of the internal combustion engine. This arrangement effectively ensures a quick change of the output power to the drive shaft, regardless of a poor response immediately after a start of the internal combustion engine.

Further, in the power output apparatus of the invention, when the drive shaft is under braking during an operation of the internal combustion engine, the input output limit setting module may set at least either of the input limit and the output limit on the assumption of a stop of the internal combustion engine. Also, when the drive shaft is under braking during an operation of the internal combustion engine, the input output limit setting module may set at least either of the input limit and the output limit according to a braking state of the drive shaft. This arrangement enables the accumulator unit to be sufficiently charged with electric power generated by regenerative control of the motor under braking.

In the power output apparatus of the invention, when an exhaust conversion unit of the internal combustion engine is warmed up during an operation of the internal combustion engine, the input output limit setting module may set at least either of the input limit and the output limit on the assumption of a stop of the internal combustion engine. This arrangement effectively ensures a quick change of the output power to the drive shaft during warm-up of the exhaust conversion unit of the internal combustion engine without deterioration of the emission.

In the power output apparatus of the invention, the power output apparatus further includes: an accelerator operation detection unit that detects an operator's accelerator operation, and the power demand specification module specifies the power demand corresponding to the accelerator operation detected by the accelerator operation detection unit, and when the accelerator operation detected by the accelerator operation detection unit during an operation of the internal combustion engine is not less than a preset level, the input output limit setting module may set at least either of the input limit and the output limit according to the detected accelerator operation. This arrangement sets the input limit and the output limit of the accumulator unit in response to the operator's accelerator operation. In this case, the input output limit setting module may set at least either of the input limit and the output limit to widen the allowable electric power range with an increase in level of the detected accelerator operation. This arrangement ensures a high response to the operator's demand.

In the power output apparatus of the invention, the input output limit setting module may set at least either of the input limit and the output limit during an operation of the internal combustion engine to widen the allowable electric power range with an increase in specified power demand. This arrangement sets the input limit and the output limit of the accumulator unit corresponding to the specified power demand.

In the power output apparatus of the invention, the power output apparatus further includes: a transmission unit that is connected to a rotating shaft of the motor and to the drive shaft and transmits output power of the rotating shaft of the motor to the drive shaft at a variable change gear ratio, and when the change gear ratio of the transmission unit is varied during an operation of the internal combustion engine, the input output limit setting module may set at least either of the input limit and the output limit on the assumption of a stop of the internal combustion engine. This arrangement ensures a smooth variation of the change gear ratio of the transmission unit.

In the power output apparatus of the invention, the input output limit setting module may set at least either of the input limit and the output limit to narrow the allowable electric power range and to attain a smooth time variation of the allowable electric power range. This arrangement effectively prevents an abrupt variation in output power to the drive shaft with an abrupt change of the input limit or the output limit.

In the power output apparatus of the invention, the power conversion mechanism may be connected to an output shaft of the internal combustion engine and to the drive shaft and may output at least part of output power from the internal combustion engine to the drive shaft through input and output of mechanical power and electric power. Further, the power conversion mechanism may include: a three shaft-type power input output module that is linked to three shafts, that is, an output shaft of the internal combustion engine, the drive shaft, and a rotating shaft, and automatically determines power input from and output to a residual one shaft based on powers input from and output to any two shafts among the three shafts; and a generator that inputs and outputs power from and to the rotating shaft. The power conversion mechanism may also include a pair-rotor motor that has a first rotor linked to an output shaft of the internal combustion engine and a second rotor linked to the drive shaft and is driven by relative rotation of the first rotor to the second rotor.

Another application of the invention is a hybrid vehicle that is equipped with the power output apparatus of the invention having any of the arrangements discussed above. The hybrid vehicle of the invention has an axle linked to a drive shaft and is equipped with a power output apparatus that outputs power to the drive shaft. The power output apparatus basically includes: an internal combustion engine; a power conversion mechanism that converts at least part of output power of the internal combustion engine into electric power; a motor that outputs power to the drive shaft; an accumulator unit that transmits electric power to and from the power conversion mechanism and the motor; an input output limit setting module that sets at least either of an input limit and an output limit of the accumulator unit, as a lower limit and an upper limit of an allowable electric power range input from and output to the accumulator unit, based on an operation or a stop of the internal combustion engine; a power demand specification module that specifies a power demand to be output to the drive shaft; and a control module that controls the internal combustion engine, the power conversion mechanism, and the motor to output a required power corresponding to the specified power demand to the drive shaft while to keep the input limit and the output limit of the accumulator unit.

The hybrid vehicle of the invention is equipped with the power output apparatus having any of the above arrangements and thus exerts the similar effects to those of the power output apparatus. Namely the hybrid vehicle ensures adequate charge and discharge of the accumulator unit, compared with the prior art structure that does not set the input limit or the output limit of the accumulator unit based on the operation or the stop of the internal combustion engine. This arrangement effectively restrains premature deterioration of the accumulator unit, while ensuring output of a required power corresponding to a specified power demand to the drive shaft.

The present invention is also directed to a control method of a power output apparatus, which includes an internal combustion engine, a power conversion mechanism that converts at least part of output power of the internal combustion engine into electric power, a motor that outputs power to a drive shaft, and an accumulator unit that transmits electric power to and from the power conversion mechanism and the motor, and the control method includes the steps of: (a) setting at least either of an input limit and an output limit of the accumulator unit, as a lower limit and an upper limit of an allowable electric power range input from and output to the accumulator unit, based on an operation or a stop of the internal combustion engine; (b) specifying a power demand to be output to the drive shaft; and (c) controlling the internal combustion engine, the power conversion mechanism, and the motor to output a required power corresponding to the specified power demand to the drive shaft while to keep the input limit and the output limit of the accumulator unit.

The control method of the power output apparatus of the invention sets at least either of the input limit and the output limit of the accumulator unit based on an operation or a stop of the internal combustion engine. The control method of the power output apparatus controls the internal combustion engine, the power conversion mechanism, and the motor to output a required power corresponding to a specified power demand to the drive shaft while to keep the input limit and the output limit of the accumulator unit. Here the power conversion mechanism and the motor are respectively designed to convert at least part of output power of the internal combustion engine into electric power and to output power to the drive shaft. Namely the control method of the power output apparatus of the invention keeps the input limit and the output limit of the accumulator unit, which are based on the operation or the stop of the internal combustion engine, while outputting the required power to the drive shaft. The structure of the invention ensures adequate charge and discharge of the accumulator unit, compared with the prior art structure that does not set the input limit or the output limit of the accumulator unit based on the operation or the stop of the internal combustion engine. This arrangement effectively restrains premature deterioration of the accumulator unit, while ensuring output of a required power corresponding to a specified power demand to the drive shaft.

In the control method of the invention, the step (a) may set at least either of the input limit and the output limit to narrow the allowable electric power range during an operation of the internal combustion engine, compared with the allowable electric power range during a stop of the internal combustion engine. This arrangement effectively reduces the charge and discharge levels of the accumulator unit during the operation of the internal combustion engine, thus desirably restraining premature deterioration of the accumulator unit.

DETAILED DESCRIPTION

Figure 1:
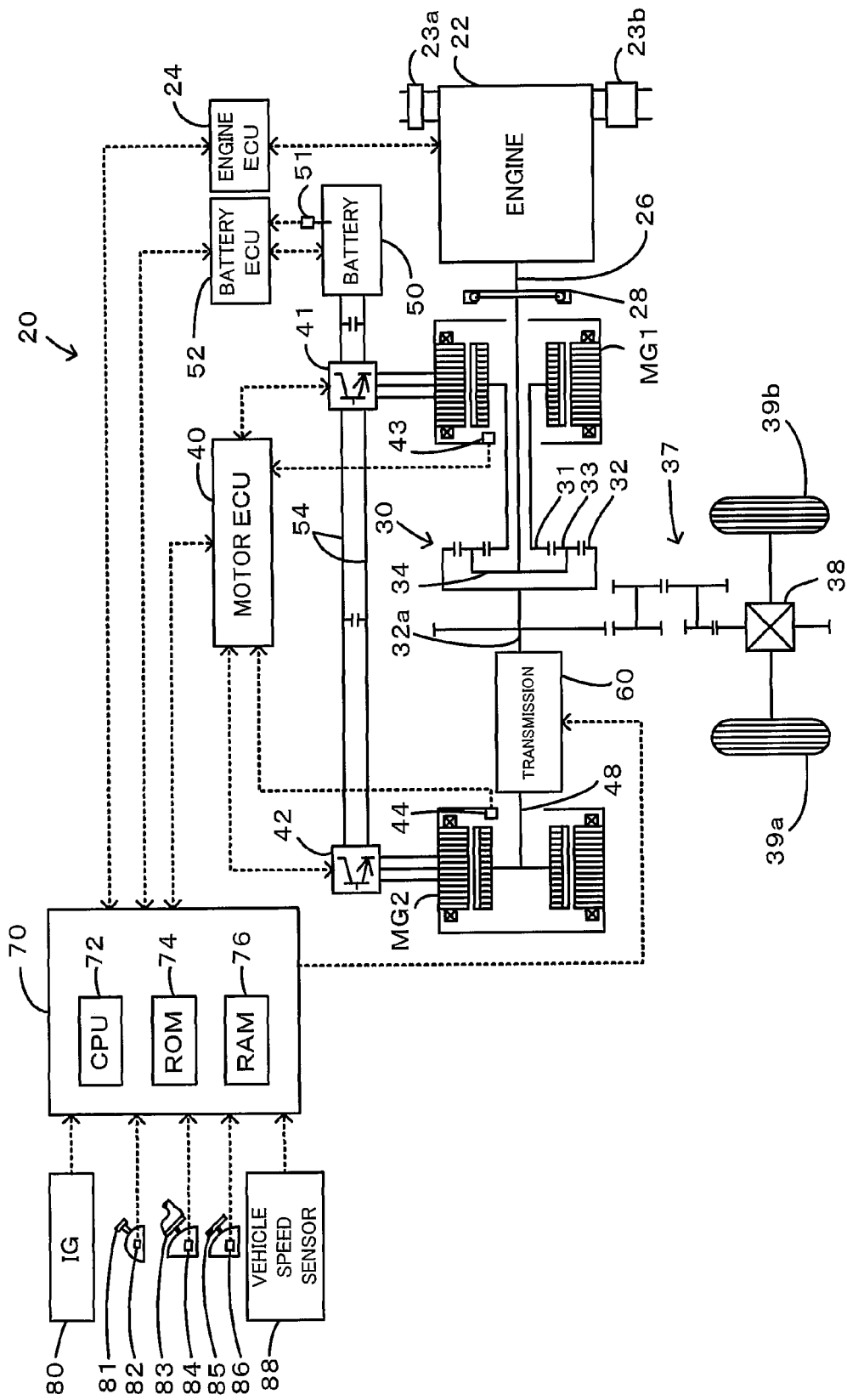
FIG. 1 schematically illustrates the configuration of a hybrid vehicle 20 equipped with a power output apparatus in one embodiment of the invention.

One mode of carrying out the invention is described below as a preferred embodiment. FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and is capable of generating electric power, a motor MG2 that is linked to the power distribution integration mechanism 30 via a transmission 60, and a hybrid electronic control unit 70 that controls the whole driving system of the hybrid vehicle 20.

The engine 22 is an internal combustion engine that consumes a hydrocarbon fuel, such as gasoline or light oil, to output power. An air fuel mixture of the intake air through an air cleaner 23a and a fuel injected from a fuel injection valve is introduced into a combustion chamber. The energy of explosive combustion of the air fuel mixture is converted to rotational motions. The exhaust gas discharged from the combustion chamber goes through an exhaust converter 23b, which is filled with a catalyst for converting unreacted hydrocarbons (HC), carbon monoxide (CO), and nitrogen oxides (NOx), and is then released to the atmosphere. An engine electronic control unit (hereafter referred to as engine ECU) 24 receives signals representing the driving conditions of the engine 22 from various sensors and controls the operations of the engine 22 to implement, for example, fuel injection control, ignition control, and intake air flow regulation. The engine ECU 24 establishes communication with the hybrid electronic control unit 70 to drive and control the engine 22 in response to control signals received from the hybrid electronic control unit 70, while outputting data regarding the driving conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gear 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the motor MG2 via the transmission 60. When the motor MG1 functions as a generator, the power of the engine 22 input through the carrier 34 is distributed into the sun gear 31 and the ring gear 32 corresponding to their gear ratio. When the motor MG1 functions as a motor, on the other hand, the power of the engine 22 input through the carrier 34 is integrated with the power of the motor MG1 input through the sun gear 31 and is output to the ring gear 32. The ring gear 32 is mechanically connected to front drive wheels 39a and 39b of the hybrid vehicle 20 via a gear mechanism 37 and a differential gear 38. The power output to the ring gear 32 is thus transmitted to the drive wheels 39a and 39b via the gear mechanism 37 and the differential gear 38. In the driving system of the hybrid vehicle 20, the power distribution integration mechanism 30 is linked to three shafts, that is, the crankshaft 26 or the output shaft of the engine 22 connected with the carrier 34, a sun gear shaft 31a or a rotating shaft of the motor MG1 connected with the sun gear 31, and a ring gear shaft 32a or a drive shaft connected with the ring gear 32 and mechanically linked to the drive wheels 39a and 39b.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged, while the input and output of electric powers are balanced between the motors MG1 and MG2. Both the motors MG1 and MG2 are driven and controlled by a motor electronic control unit (hereafter referred to as motor ECU) 40. The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 executes a rotation speed computation routine (not shown) to calculate rotation speeds Nm1 and Nm2 of the rotors of the motors MG1 and MG2 from the input signals from the rotation position detection sensors 43 and 44. The motor ECU 40 establishes communication with the hybrid electronic control unit 70 to drive and control the motors MG1 and MG2 in response to control signals received from the hybrid electronic control unit 70, while outputting data regarding the driving conditions of the motors MG1 and MG2 to the hybrid electronic control unit 70 according to the requirements.

Figure 2:
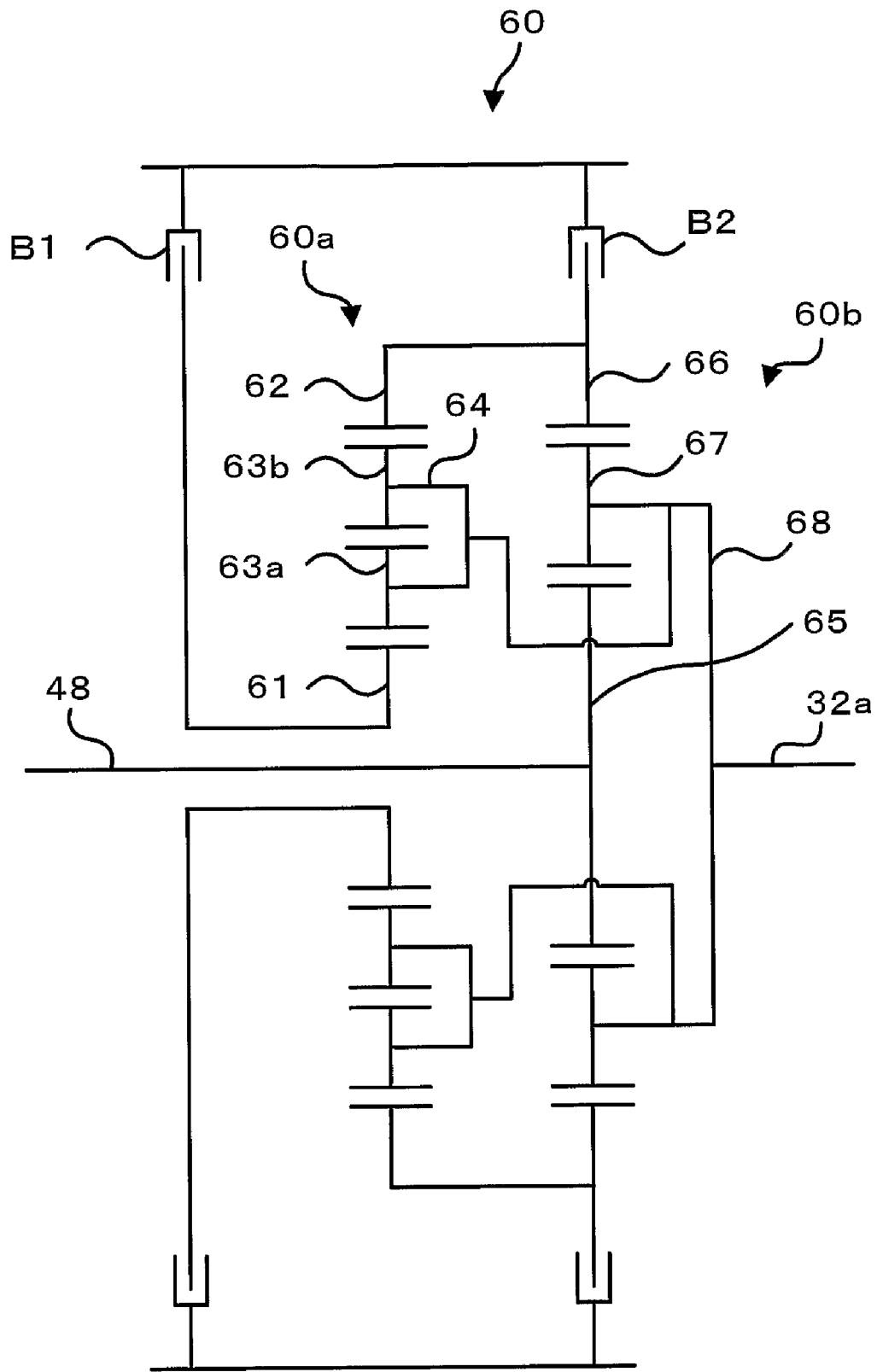
FIG. 2 shows one typical structure of a transmission included in the hybrid vehicle of the embodiment.

The transmission 60 functions to connect and disconnect a rotating shaft 48 of the motor MG2 with and from the ring gear shaft 32a. In the connection state, the transmission 60 reduces the rotation speed of the rotating shaft 48 of the motor MG2 at two different reduction gear ratios and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gear 63a engaging with the sun gear 61, multiple second pinion gears 63b engaging with the multiple first pinion gears 63a and with the ring gear 62, and a carrier 64 coupling the multiple first pinion gears 63a with the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively high reduction gear ratio and transmits the reduced rotation to the ring gear shaft 32a. This state is expressed as Lo gear position. The combination of the engaged brake B1 and the released brake B2 reduces the rotation of the rotating shaft 48 of the motor MG2 at a relatively low reduction gear ratio and transmits the reduced rotation to the ring gear shaft 32a. This state is expressed as Hi gear position. The combination of the engaged brakes B1 and B2 prohibits the rotations of the rotating shaft 48 and the ring gear shaft 32a.

The battery 50 is under control of a battery electronic control unit (hereafter referred to as battery ECU) 52. The batter ECU 52 inputs signals required for management of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the conditions of the battery 50 to the hybrid electronic control unit 70 by communication according to the requirements. For management of the battery 50, the battery ECU 52 computes a remaining charge level or current state of charge (SOC) of the battery 50 from an integration of the charge-discharge current measured by the current sensor (not shown).

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 outputs drive signals to actuators (not shown) to regulate the brakes B1 and B2 in the transmission 60. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

The hybrid vehicle 20 of the embodiment having the above construction sets a torque demand to be output to the ring gear shaft 32a or the drive shaft corresponding to the given vehicle speed V and the given accelerator opening Acc (equivalent to the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops.

Figure 3:
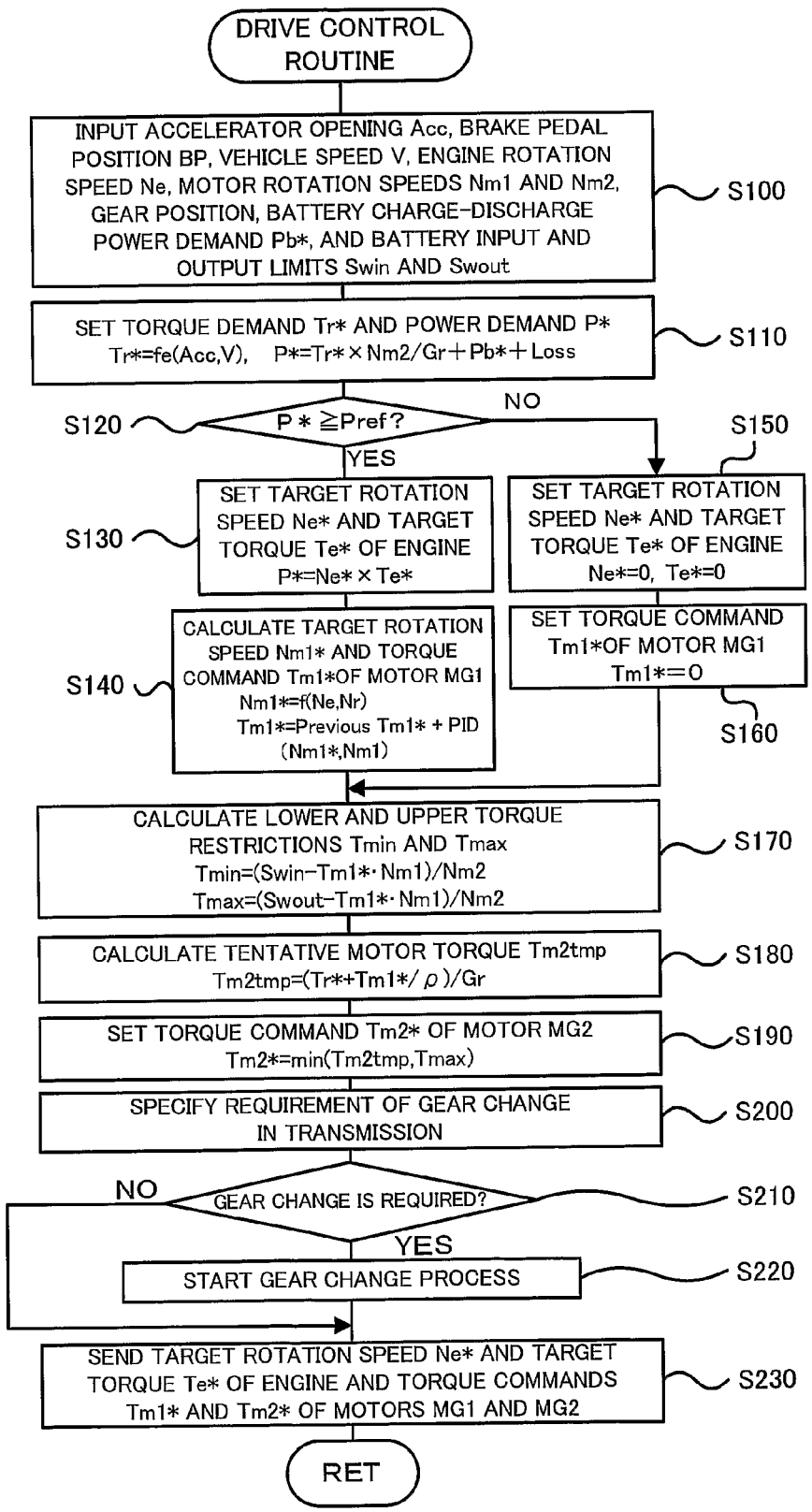
FIG. 3 is a flowchart showing a drive control routine executed by the hybrid electronic control unit 70.

The description now regards the operations of the hybrid vehicle 20 of the embodiment having the configuration discussed above. FIG. 3 is a flowchart showing a drive control routine executed by the hybrid electronic control unit 70. This routine is carried out repeatedly at preset time intervals (for example, at every 8 msec).

In the drive control routine, the CPU 72 of the hybrid electronic control unit 70 first inputs various data required for control, that is, the accelerator opening Acc from the accelerator pedal position sensor 84, the brake pedal position BP from the brake pedal position sensor 86, the vehicle speed V from the vehicle speed sensor 88, a rotation speed Ne of the engine 22, rotation speeds Nm1 and Nm2 of the motors MG1 and MG2, a gear position in the transmission 60, and a charge-discharge power demand Pb*, an input limit Swin, and an output limit Swout of the battery 50 (step S100). The rotation speed Ne of the engine 22 is computed from a signal representing a crank position detected by a crank position sensor (not shown) attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. A flag set in response to a gearshift of the transmission 60 is input as the gear position in the transmission 60. The charge-discharge power demand Pb* of the battery 50 is set based on a remaining charge or a current state of charge (SOC) of the battery 52, as a level of electric power to charge the battery 50 or to be discharged from the battery 50 by the battery ECU 52, and is sent from the battery ECU 52 via communication. The input limit Swin and the output limit Swout of the battery 50 are set according to an input output limit setting routine shown in the flowchart of FIG. 4 executed by the battery ECU 52, and are sent from the battery ECU 52 via communication. The input output limit setting routine will be discussed later in detail.

Figure 5:
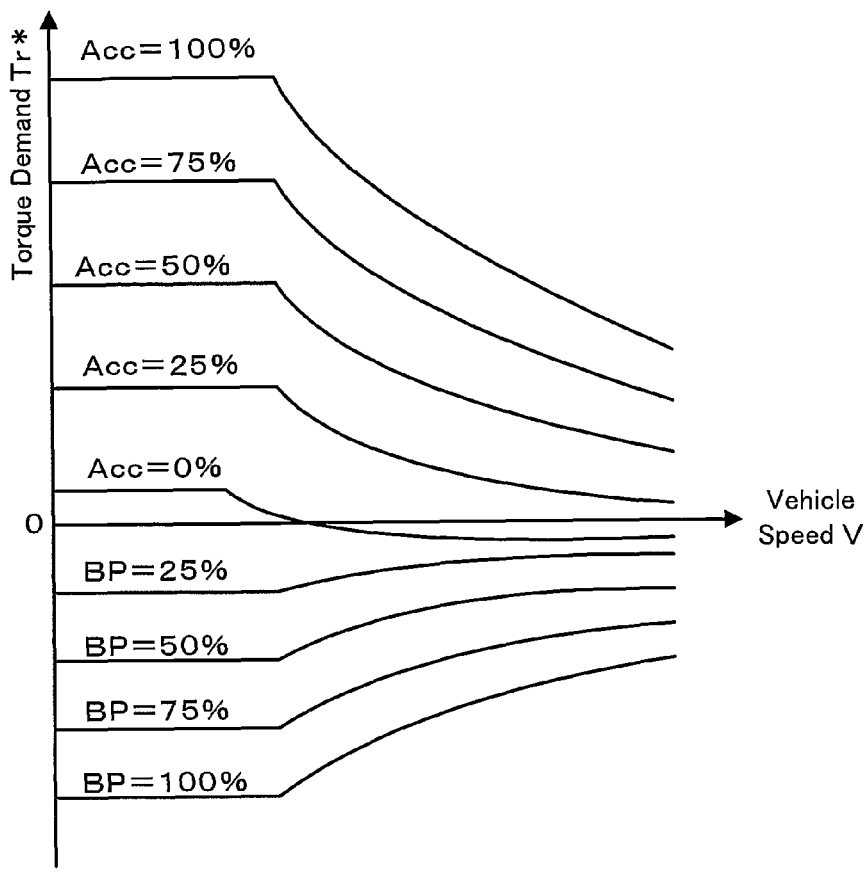
FIG. 5 shows one example of a torque demand setting map.

After the data input, the CPU 72 sets a torque demand Tr* to be output to the ring gear shaft 32a or the drive shaft linked to the drive wheels 39a and 39b as the torque required for the vehicle and a power demand P* required to drive the hybrid vehicle 20, based on the input accelerator opening Acc, the input brake pedal position BP, and the input vehicle speed V (step S110). A concrete procedure of setting the torque demand Tr* in this embodiment stores in advance variations in torque demand Tr* against the accelerator opening Acc, the brake pedal position BP, and the vehicle speed V as a torque demand setting map in the ROM 74 and reads the torque demand Tr* corresponding to the given accelerator opening Acc, the given brake pedal position BP, and the given vehicle speed V from the map. One example of the torque demand setting map is shown in FIG. 5. The power demand P* is calculated as the sum of the product of the torque demand Tr* and a rotation speed Nr of the ring gear shaft 32a or the drive shaft, the charge-discharge power demand Pb* of the battery 50, and a potential loss. The rotation speed Nr of the ring gear shaft 32a is obtained by multiplying the vehicle speed V by a conversion coefficient k or by dividing the rotation speed Nm2 of the motor MG2 by a gear ratio Gr of the reduction gear 35.

Figure 6:
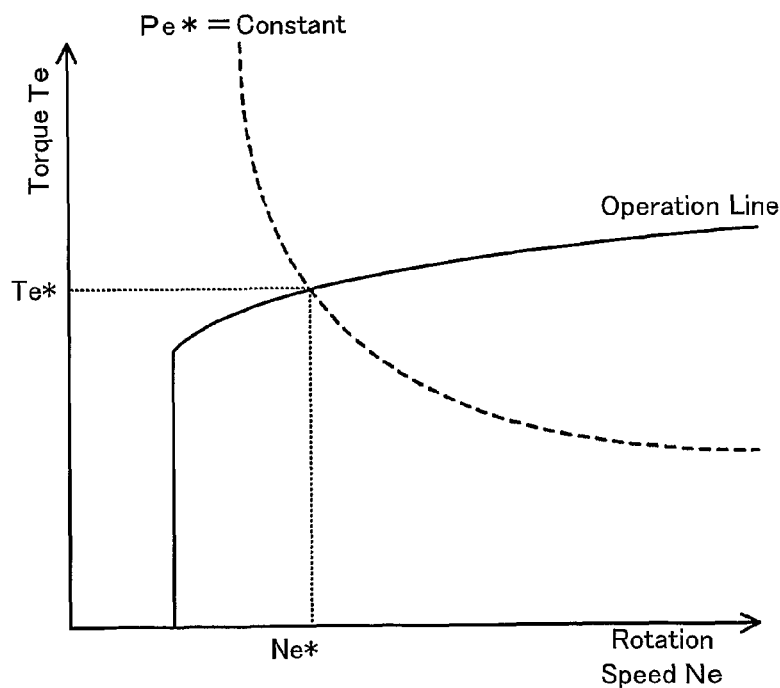
FIG. 6 shows an efficient operation line of an engine 22 to set the target rotation speed Ne* and the target torque Te*.

After setting of the torque demand Tr* and the power demand P* at step S110, the set power demand P* is compared with a predetermined threshold value Pref (step S120). The threshold value Pref is used as a criterion of determining whether the operation of the engine 22 is to be stopped and is set to or around a lower limit of efficient power output from the engine 22. When the power demand P* is not less than the predetermined threshold value Pref, the CPU 72 sets a target rotation speed Ne* and a target torque Te* of the engine 22 corresponding to the power demand P* (step S130). The target rotation speed Ne* and the target torque Te* of the engine 22 are determined according to an efficient operation line of ensuring efficient operations of the engine 22 and the power demand P*. FIG. 6 shows an efficient operation line of the engine 22 to set the target rotation speed Ne* and the target torque Te*. As clearly shown in FIG. 6, the target rotation speed Ne* and the target torque Te* are given as an intersection of the efficient operation line and a line of constant power demand P* (=Ne*×Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S140):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2\int(Nm1^* - Nm1)dt \quad (2)$$

Figure 7:
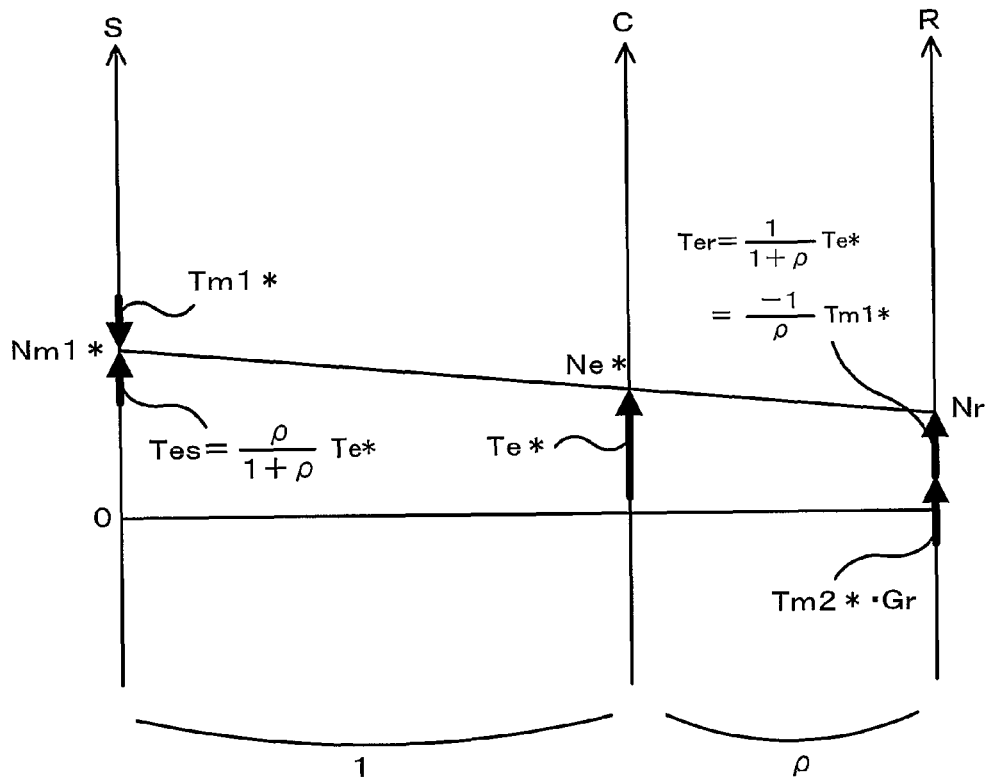
FIG. 7 is an alignment chart showing torque-rotation speed dynamics of respective rotation elements included in a power distribution integration mechanism.

Equation (1) is a dynamic relational expression of the rotation elements included in the power distribution integration mechanism 30. FIG. 7 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a), which is obtained by multiplying the rotation speed Nm2 of the motor MG2 by the gear ratio Gr of the reduction gear 35. Equation (1) is readily introduced from this alignment chart of FIG. 7. Two thick arrows on the axis 'R' respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S170):

$$Tmin=(Swin-Tm1^{*}\cdot Nm1)/Nm2 \qquad (3)$$

$$Tmax=(Swout-Tm1^{*}\cdot Nm1)/Nm2 \qquad (4)$$

The lower torque restriction Tmin and the upper torque restriction Tmax are respectively given by dividing a difference between the input limit Swin of the battery 50 and power consumption (power generation) of the motor MG1, which is the product of the torque command Tm1* and the input current rotation speed Nm1 of the motor MG1, and a difference between the output limit Swout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S180):

$$Tm2tmp=(Tr^{*}+Tm1^{*}/\rho)/Gr \qquad (5)$$

The CPU 72 limits the tentative motor torque Tm2tmp to the range between the calculated lower torque restriction Tmin and upper torque restriction Tmax to set a torque command Tm2* of the motor MG2 (step S190). Setting the torque command Tm2* of the motor MG2 in this manner restricts the torque demand Tr* to be output to the ring gear shaft 32a or the drive shaft within the range between the input limit Swin and the output limit Swout of the battery 50. Equation (5) is readily introduced from the alignment chart of FIG. 7.

Figure 8:
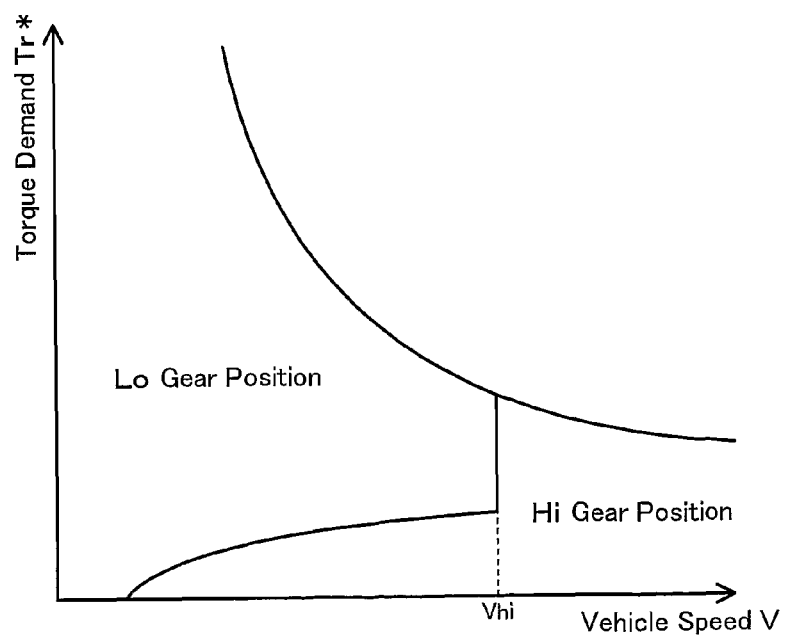
FIG. 8 shows one example of a gear position setting map.

The CPU 72 then specifies the requirement of gear change in the transmission 60 according to the vehicle speed V and the torque demand Tr* (step S200). In this embodiment, a variation in gear position against the torque demand and the vehicle speed V is stored in advance as a gear position setting map in the ROM 74. The procedure of specification reads the gear position corresponding to the given torque demand Tr* and the given vehicle speed V from the map and compares the read gear position with the current gear position. One example of the gear position setting map is shown in FIG. 8. In this embodiment, the profile of the speed change line is set to maximize the Lo gear position in the transmission 60 and to decrease the output torque of the motor MG2 to approximately zero at the positive vehicle speed V. This ensures the efficient operation of the motor MG2, while effectively reducing a shift shock. The motor MG2 is driven at the rotation speed of not less than a preset upper limit. When the vehicle speed V is not lower than a specific speed level Vhi corresponding to a specific rotation speed that is slightly lower than this upper limit rotation speed, the transmission 60 is set to the Hi gear position, regardless of the torque demand Tr*.

Figure 9:
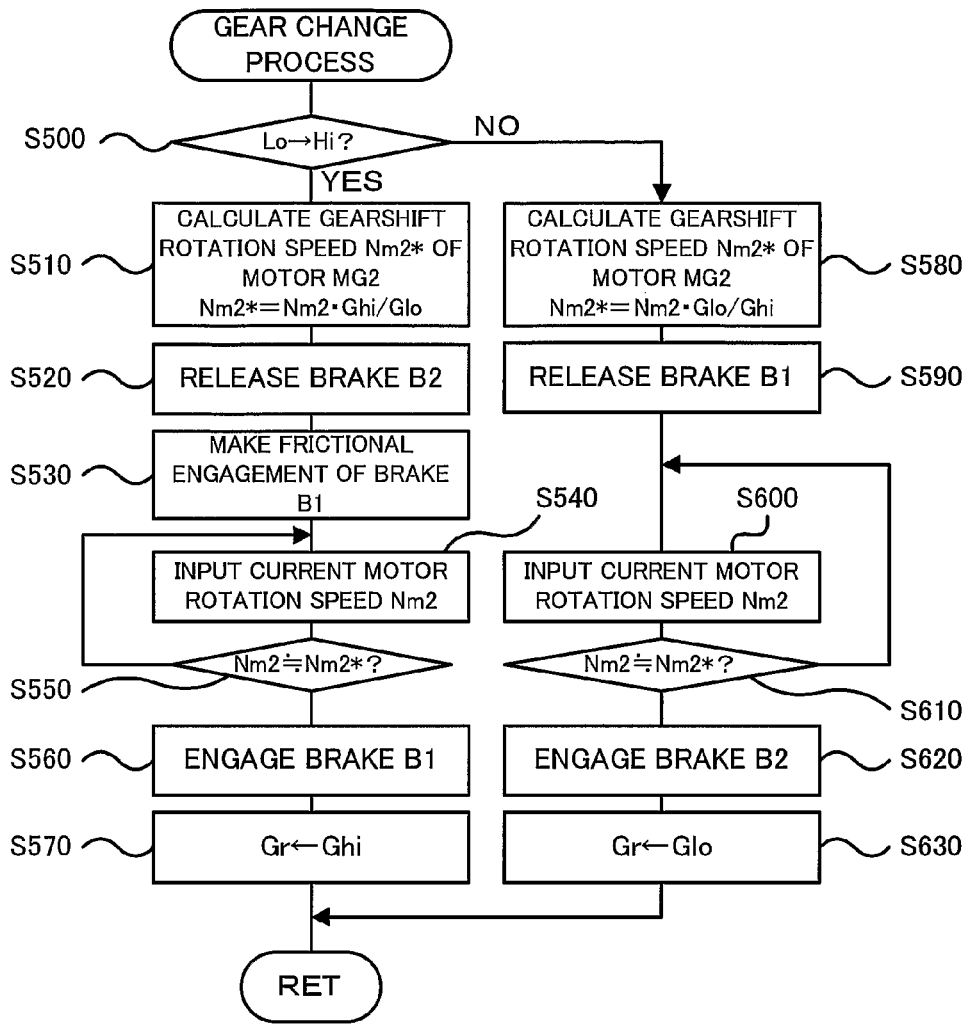
FIG. 9 is a flowchart showing a gear change process executed by the hybrid electronic control unit 70.

When the gear change in the transmission 60 is not required (step S210), the CPU 72 sends the target rotation speed Ne* and the target torque Te* of the engine 22 to the engine ECU 24, while sending the torque commands Tm1* and Tm2* of the motors MG1 and MG2 to the motor ECU 40 (step S230). The CPU 72 then exits from this drive control routine. The engine ECU 24 receives the target rotation speed Ne* and the target torque Te* and executes fuel injection control and ignition control of the engine 22 to drive the engine 22 at the specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*. When the gear change in the transmission 60 is required (step S210), on the other hand, the CPU 72 outputs a gear change start command to start the gear change in the transmission 60 (step S220). The CPU then sends the target rotation speed Ne* and the target torque Te* of the engine 22 to the engine ECU 24, while sending the torque commands Tm1* and Tm2* of the motors MG1 and MG2 to the motor ECU 40 (step S230). This terminates the drive control routine. In response to output of the gear change start command, the hybrid electronic control unit 70 starts a gear change process shown in the flowchart of FIG. 9, in parallel with the drive control routine. The gear change start command is not output during execution of the gear change. This prevents multiple start commands from being output with regard to one identical requirement of gear change. The gear change process is described briefly.

The gear change process first specifies the gear shift direction in the transmission 60 (step S500). In response to a shift from the Lo gear position to the Hi gear position, a gearshift rotation speed Nm2* of the motor MG2 is calculated from the current rotation speed Nm2 of the motor MG2 and low and high gear ratios Glo and Ghi of the transmission 60 according to Equation (6) given below (step S510):

$$Nm2^{*}=Nm2\cdot Ghi/Glo \qquad (6)$$

The gear change process subsequently releases the brake B2 (step S520), makes frictional engagement of the brake B1 (step S530), and waits until the current rotation speed Nm2 of the motor MG2 sufficiently approaches to the gearshift rotation speed Nm2* (steps S540 and S550). The gear change process fully engages the brake B1 (step S560) and sets the high gear ratio Ghi to the gear ratio Gr of the transmission 60 used for drive control (step S570). This terminates the gear change process. In response to a shift from the Hi gear position to the Lo gear position, on the other hand, the gearshift rotation speed Nm2* of the motor MG2 is calculated from the current rotation speed Nm2 of the motor MG2 and the low and high gear ratios Glo and Ghi of the transmission 60 according to Equation (7) given below (step S580):

$$Nm2^{*}=Nm2\cdot Glo/Ghi \qquad (7)$$

The gear change process subsequently releases the brake B1 (step S590) and waits until the current rotation speed Nm2 of the motor MG2 sufficiently approaches to the gearshift rotation speed Nm2* (steps S600 and S610). The gear change process engages the brake B2 (step S620) and sets the low gear ratio Glo to the gear ratio Gr of the transmission 60 used for drive control (step S630) This terminates the gear change process.

Referring back to the drive control routine of FIG. 3, when the power demand P* is less than the predetermined threshold value Pref at step S120, the operation of the engine 22 is to be stopped. The CPU 72 accordingly sets both the target rotation speed Ne* and the target torque Te* of the engine 22 to zero (step S150), sets the torque command Tm1* of the motor MG1 to zero (step S160), sets the toque command Tm2* of the motor MG2 (steps S170 to S190), and specifies the requirement of gear change in the transmission 60 (steps S200 to S220). The CPU 72 sends the target rotation speed Ne* and the target torque Te* of the engine 22 to the engine ECU 24 and the torque commands Tm1* and Tm2* of the motors MG1 and MG2 to the motor ECU 40 (step S230), and exits from the drive control routine. The engine ECU 24 receives the target rotation speed Ne* and the target torque Te* set equal to zero and stops the operation of the engine 22.

Figure 4:
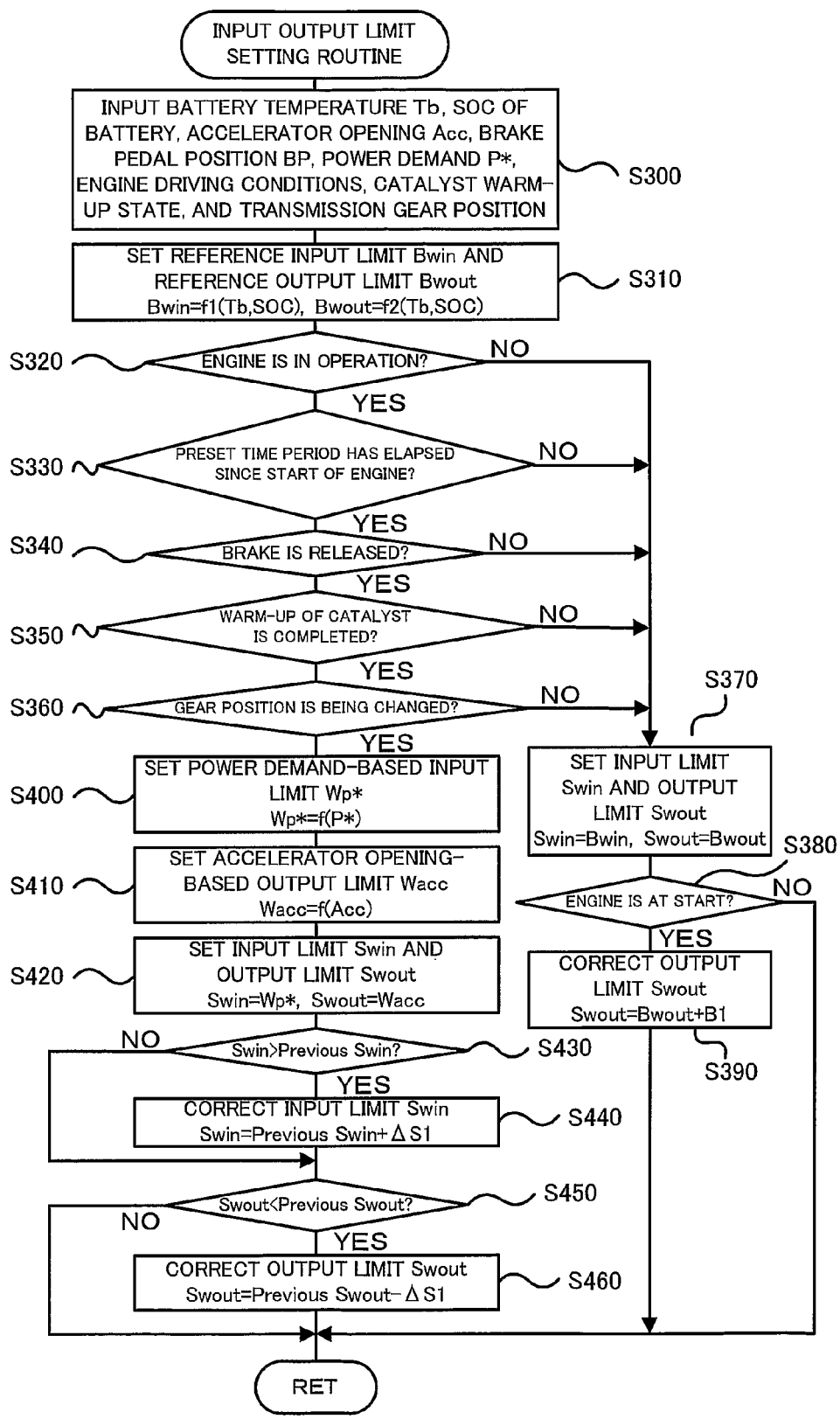
FIG. 4 is a flowchart showing an input output limit setting routine executed by a battery ECU in the hybrid vehicle of the embodiment.

The description now regards the process of setting the input limit Swin and the output limit Swout of the battery 50, which is executed by the battery ECU 52 according to the input output limit setting routine of FIG. 4 as mentioned previously. In the input output limit setting routine, the battery ECU 52 first inputs various data required for setting the input and output limits Swin and Swout, that is, the battery temperature Tb and the current state of charge (SOC) of the battery 50, the accelerator opening Acc, the brake pedal position BP, the power demand P*, the driving conditions of the engine 22, the warm-up state of the catalyst in the exhaust converter 23*b*, and the gear position in the transmission 60 (step S300). The accelerator opening Acc, the brake pedal position BP, the power demand P*, the driving conditions of the engine 22, the warm-up state of the catalyst in the exhaust converter 23*b*, and the gear position in the transmission 60 are received from the hybrid electronic control unit 70 by communication. The engine ECU 24 computes the catalyst temperature of the exhaust converter 23*b*, based on the outside temperature at a start of the engine 22 and the accumulated air intake flow after the start of the engine 22. The computed catalyst temperature is input into the hybrid electronic control unit 70 as the warm-up state of the catalyst in the exhaust converter 23*b* through communication between the engine ECU 24 and the hybrid electronic control unit 70.

Figure 10:
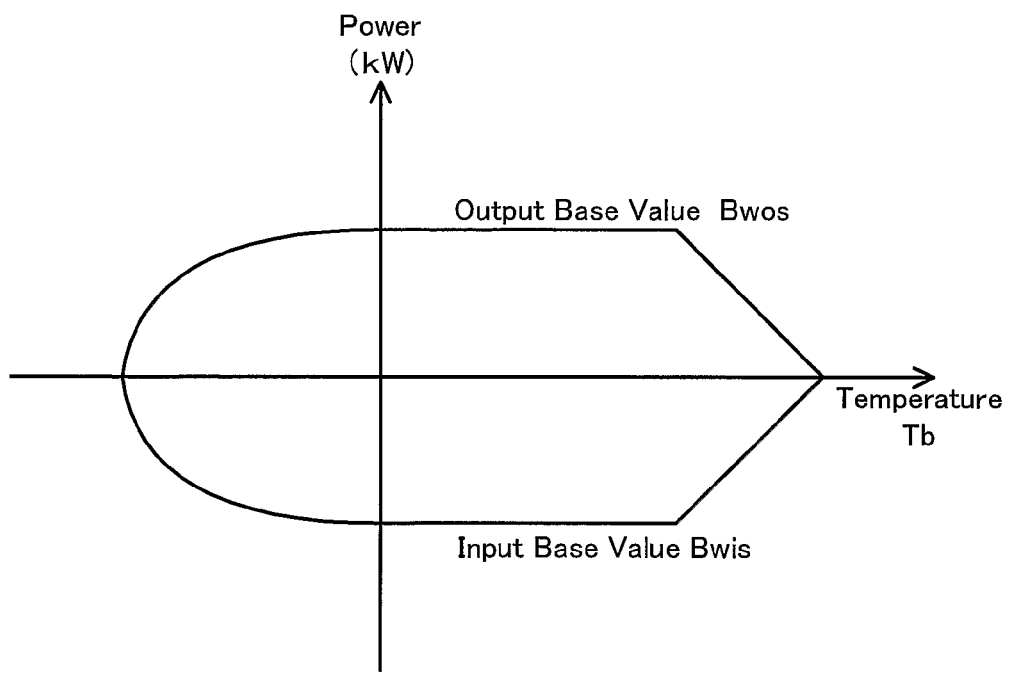
FIG. 10 shows variations in input base value Bwis and output base value Bwos against the temperature Tb of a battery.
Figure 11:
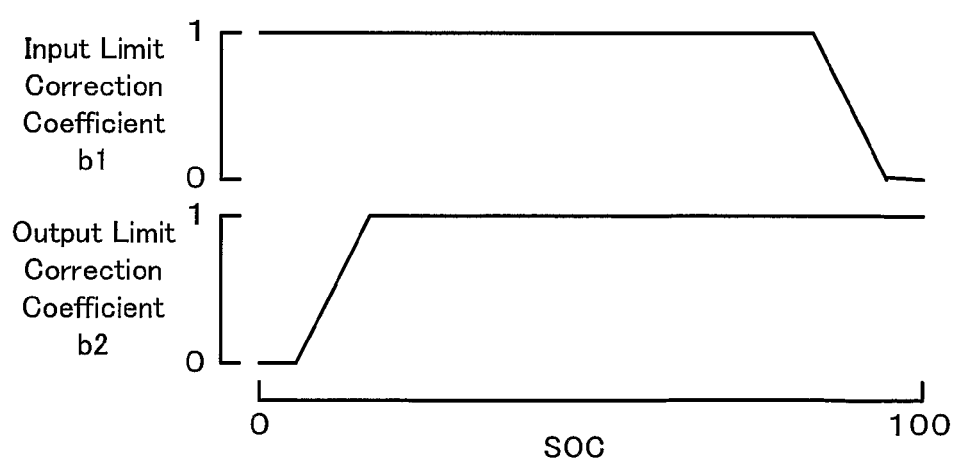
FIG. 11 shows variations in input limit correction coefficient b1 and output limit correction coefficient b2 against the current state of charge (SOC) of the battery 50.

After the data input, the battery ECU 52 sets a reference input limit Bwin and a reference output limit Bwout corresponding to the input battery temperature Tb and the input state of charge (SOC) of the battery 50 (step S310). A concrete procedure specifies an input base value Bwis and an output base value Bwos corresponding to the battery temperature Tb, specifies an input limit correction coefficient b1 and an output limit correction coefficient b2 according to the current state of charge (SOC) of the battery 50, multiplies the specified input and output base values Bwis and Bwos by the respective correction coefficients b1 and b2 to set the reference input limit Bwin and the reference output limit Bwout. FIG. 10 shows variations in input and output base values Bwis and Bwos against the battery temperature Tb, and FIG. 11 shows variations in input limit correction coefficient b1 and output limit correction coefficient b2 against the current state of charge (SOC) of the battery 50.

The battery ECU 52 sequentially determines whether the engine 22 is in operation (step S320), whether a preset time period has elapsed since the start of the engine 22 (step S330), whether the brake is released (step S340), whether the warm-up of the catalyst is completed in the exhaust converter 23*b* (step S350), and whether the gear position is being changed in the transmission 60 (that is, whether the transmission 60 is under the gearshift) (step S360). The preset time period in step S330 represents a time required to allow the engine 22 to normally change its drive point and depends upon the performances of the engine 22. The on-off (engagement/release) of the brake is specified by the input brake pedal position BP.

When the results of the successive determinations show fulfillment of any one of the following conditions, the reference input limit Bwin and the reference output limit Bwout are set to the input limit Swin and the output limit Swout of the battery 50 (step S370). The conditions are that the engine 22 stops, that the preset time period has not yet elapsed since the start of the engine 22, that the brake is engaged, that the warm-up of the catalyst is not completed in the exhaust converter 23*b*, and the transmission 60 is under the gearshift. At a start of the engine 22, the output limit Swout of the battery 50 is corrected to a sum of the reference output limit Bwout and a temporary output increase Bi (steps S380 and S390). The input output limit setting routine is then terminated. Because of the reasons given below, the reference input limit Bwin and the reference output limit Bwout, which depend on the conditions of the battery 50 (the battery temperature Tb and the state of charge (SOC)), are set respectively to the input limit Swin and the output limit Swout of the battery 50. When the engine 22 stops or when the preset time period has not yet elapsed since the start of the engine 22, the hybrid vehicle 20 is driven with only the output power of the motor MG2. It is thus required to extend the input and output limits of the battery 50 for supplying electric power to the motor MG2 to the widest possible range. In the brake on position, regenerative control of the motor MG2 is required to charge the battery 50 and recover most of the kinetic energy. When the warm-up of the catalyst is not completed in the exhaust converter 23*b*, the emission control prevents the engine 22 from generating a sufficiently large output power. The large output power of the motor MG2 is thus required to drive the hybrid vehicle 20. Under the gearshift of the transmission 60, the motors MG1 and MG2 may be driven according to the requirements. In the starting of the engine 22, the sum of the reference output limit Bwout and the temporary output increase Bi is set to the output limit Swout of the battery 50. A start of the engine 22 may temporarily require a large electric power. The output of the large electric power from the battery 50 even over the reference output limit Bwout does not drastically deteriorate the battery 50, as long as such enhanced power output continues only a short time period.

Figure 12:
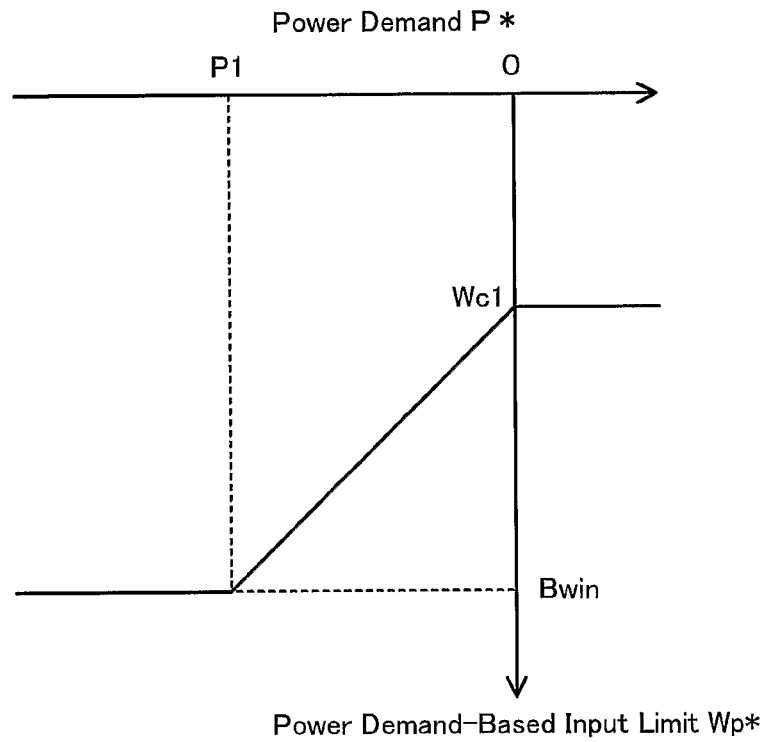
FIG. 12 shows one example of a power demand-based input limit setting map.
Figure 13:
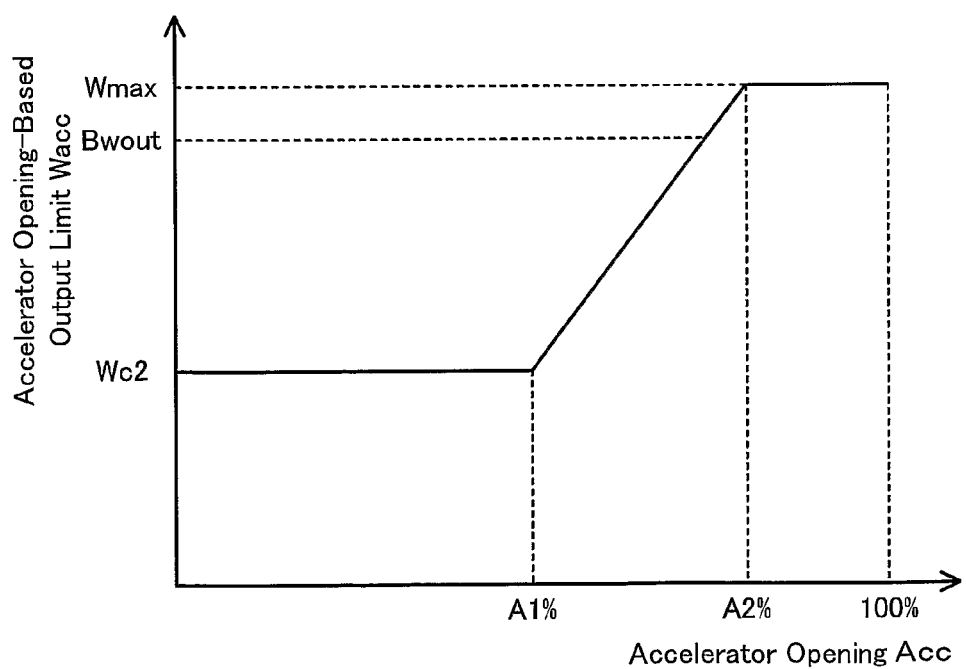
FIG. 13 shows one example of an accelerator opening-based output limit setting map.

Upon fulfillment of all of the conditions that the preset time period has elapsed since the start of the engine 22, that the brake is released, that the warm-up of the catalyst is completed in the exhaust converter 23*b*, and that the transmission 60 is not under the gearshift, the battery ECU 52 sets a power demand-based input limit Wp* corresponding to the input power demand P* (step S400), sets an accelerator opening-based output limit Wacc corresponding to the input accelerator opening Acc (step S410), and sets the power demand-based input limit Wp* and the accelerator opening-based output limit Wacc respectively to the input limit Swin and the output limit Swout of the battery 50 (step S420). The procedure of setting the power demand-based input limit Wp* in this embodiment stores in advance a variation in power demand-based input limit Wp* against the power demand P* as a power demand-based input limit setting map in a ROM (not shown) and reads the power demand-based input limit Wp* corresponding to the given power demand P* from the map. The procedure of setting the accelerator opening-based output limit Wacc in this embodiment stores in advance a variation in accelerator opening-based output limit Wacc against the accelerator opening Acc as an accelerator opening-based output limit setting map in the ROM (not shown) and reads the accelerator opening-based output limit Wacc corresponding to the given accelerator opening Acc from the map. One example of the power demand-based input limit setting map is given in FIG. 12, and one example of the accelerator opening-based output limit setting map is given in FIG. 13. In the illustrated example of FIG. 12, the power demand-based input limit Wp* is kept at a temperature-sustaining input power Wc1 for the positive power demand P*. The temperature-sustaining input power Wc1 represents an electric power level that does not rise the temperature of the battery 50 even in the state of continuous charge of the battery 50. The power demand-based input limit Wp* proportionally decreases to the reference input limit Bwin with a decrease in negative power demand P* (with an increase in absolute value of the power demand P*), and is kept at the reference input limit Bwin for the power demand P* of not higher than a value P1. The power demand-based input limit Wp* is set to the input limit Swin. The input limit Swin is accordingly kept at the temperature-sustaining input power Wc1, which is higher than the reference input limit Bwin, for the positive power demand P*. The input limit Swin is set to the sum of the charging power of the battery 50 and the temperature-sustaining input power Wc1, which decreases to the reference input limit Bwin with a decrease in negative power demand P*, while being kept at the reference input limit Bwin for the power demand P* of not higher than the value P1. In the illustrated example of FIG. 13, the accelerator opening-based output limit Wacc is kept at a temperature-sustaining output power Wc2 until the accelerator opening Acc reaches to a middle opening A1%. The temperature-sustaining output power Wc2 represents an electric power level that does not rise the temperature of the battery 50 even in the state of continuous discharge of the battery 50. The accelerator opening-based output limit Wacc increases to a temporary maximum output power Wmax with an increase in accelerator opening Acc from the middle opening A1% to a high opening A2%. The temporary maximum output power Wmax is equal to the sum of the reference output limit Bwout and the temporary output increase Bi. The accelerator opening-based output limit Wacc is kept at the temporary maximum output power Wmax for the accelerator opening Acc of greater than the high opening A2%. The accelerator opening-based output limit Wacc is set to the output limit Swout. The output limit Swout is accordingly kept at the temperature-sustaining output power Wc2, which is lower than the reference output limit Bwout, for the accelerator opening Acc of not greater than the middle opening A1%. The output limit Swout increases to the temporary maximum output power Wmax with an increase in accelerator opening Acc from the middle opening A1% to a high opening A2%, while being kept at the temporary maximum output power Wmax for the accelerator opening Acc of greater than the high opening A2%. During the operation of the engine 22, the input limit Swin and the output limit Swout are basically set to the temperature-sustaining input power Wc1 that is higher than the reference input limit Bwin and to the temperature-sustaining output power Wc2 that is lower than the reference output limit Bwout. This ensures the stricter limitation of the input and the output of the battery 50 during the operation of the engine 22, compared with the limitation during a stop of the engine 22. Such setting of the input limit Swin and the output limit Swout restricts the input and the output of the battery 50 to a level required for the demanded power output from the motor MG2 to compensate for a response delay of the engine 22. Namely the required power of the hybrid vehicle 20 (power demand P*) is basically supplied by the engine 22. Such settings effectively prevent the battery 50 from being frequently charged or discharged to a level over the temperature-sustaining input power Wc1 or over the temperature-sustaining output power Wc2, thus restraining premature deterioration of the battery 50. In the negative power demand P*, the input limit Swin is decreased to recover a greater portion of kinetic energy in the form of electric energy. For the accelerator opening Acc of greater than the middle opening A1%, the output limit Swout is increased to respond to the driver's demand. This attains good balance among prevention of the premature deterioration of the battery 50, enhancement of the energy efficiency, and high response to the driver's demand.

After the input limit Swin and the output limit Swout are respectively set to the power demand-based input limit Wp* and to the accelerator opening-based output limit Wacc at step S420 (in the flowchart of FIG. 4), the input output limit setting routine goes to steps S430 to S460. In response to the onset of a change to the stricter limitation of the input and the output of the battery 50, that is, in response to an increasing tendency of the input limit Swin (a decreasing tendency of the absolute value of the input limit Swin) and a decreasing tendency of the output limit Swout, the battery ECU 52 corrects the input limit Swin and the output limit Swout by addition and subtraction of a preset correction value ΔS1 (steps S430 to S460). This correction prevents abrupt changes of the input limit Swin and the output limit Swout and accordingly restrains a potential torque shock due to the changes of the input limit Swin and the output limit Swout. The input output limit setting routine is then terminated.

As described above, the hybrid vehicle 20 of the embodiment basically sets the input limit Swin and the output limit Swout of the battery 50 to the temperature-sustaining input power Wc1 and the temperature-sustaining output power Wc2 during the operation of the engine 22. The temperature-sustaining input power Wc1 and the temperature-sustaining output power Wc2 represent the stricter levels of input and output limitations than the reference input limit Bwin and the reference output limit Bwout, which depend upon the observed conditions of the battery 50 and are set to the input limit Swin and the output limit Swout during a stop of the engine 22. Such settings effectively prevent the battery 50 from being charged or discharged to a level over the temperature-sustaining input power Wc1 or over the temperature-sustaining output power Wc2, thus restraining premature deterioration of the battery 50. Even during the operation of the engine 22, the input limit Swin is decreased for the negative power demand P* to recover a greater portion of kinetic energy in the form of electric energy. Even during the operation of the engine 22, the output limit Swout is increased for the accelerator opening Acc of greater than the middle opening A1% to respond to the driver' demand. This attains good balance among prevention of the premature deterioration of the battery 50, enhancement of the energy efficiency, and high response to the driver's demand. Even during the operation of the engine 22, when the preset time period has not yet elapsed since the start of the engine 22, when the warm-up of the catalyst is not completed in the exhaust converter 23b, when the brake is engaged, or when the gear position is being changed in the transmission 60, the input limit Swin and the output limit Swout are set to the reference input limit Bwin and the reference output limit Bwout, which depend upon the observed conditions of the battery 50. This enables a drive of the hybrid vehicle 20 in response to the driver's operations, recovery of a large portion of kinetic energy, and a smooth gear change of the transmission 60 without deterioration of emission. In response to the onset of a change to the stricter limitation of the input and the output of the battery 50, the hybrid vehicle 20 of the embodiment corrects the input limit Swin and the output limit Swout by addition and subtraction of the preset correction value ΔS1. This correction prevents abrupt changes of the input limit Swin and the output limit Swout and accordingly restrains a potential torque shock due to the changes of the input limit Swin and the output limit Swout. While the engine 22 stops, the input limit Swin and the output limit Swout are set to the reference input limit Bwin and the reference output limit Bwout, which depend upon the observed conditions of the battery 50. This ensures sufficient exertion of the performance of the battery 50. The hybrid vehicle 20 of the embodiment is driven with output of the driver's required power corresponding to the power demand P* to the ring gear shaft 32a or the drive shaft, whether the engine 22 operates or stops.

Even during the operation of the engine 22, when the preset time period has not yet elapsed since the start of the engine 22, when the warm-up of the catalyst is not completed in the exhaust converter 23b, when the brake is engaged, or when the gear position is being changed in the transmission 60, the hybrid vehicle 20 of the embodiment sets the input limit Swin and the output limit Swout to the reference input limit Bwin and the reference output limit Bwout, which depend upon the observed conditions of the battery 50. The input limit Swin and the output limit Swout may be set to the reference input limit Bwin and the reference output limit Bwout under any other conditions during the operation of the engine 22. In another possible modification, any one of the conditions that the preset time period has not yet elapsed since the start of the engine 22, that the warm-up of the catalyst is not completed in the exhaust converter 23b, that the brake is engaged, and that the gear position is being changed in the transmission 60 may be omitted from the conditions for setting the input limit Swin and the output limit Swout to the reference input limit Bwin and the reference output limit Bwout. Under the omitted condition, the input limit Swin and the output limit Swout may alternatively be set to the power demand-based input limit Wp* and to the accelerator opening-based output limit Wacc. The input limit Swin and the output limit Swout may otherwise be set to stricter levels of input and output limitations than the reference input limit Bwin and the reference output limit Bwout according to the various measurement results, for example, the elapse of time since the start of the engine 22, the warm-up level of the catalyst in the exhaust converter 23b, and the magnitude of the braking force.

While the engine 22 operates, the hybrid vehicle 20 of the embodiment basically sets the input limit Swin to the power demand-based input limit Wp*, which depends on the power demand P*. One possible modification may set a fixed value, for example, the temperature-sustaining input power Wc1, to the input limit Swin, independently of the power demand P*. The fixed value is not restricted to the temperature-sustaining input power Wc1 but may be greater than or smaller than the temperature-sustaining input power Wc1. The power demand-based input limit Wp* may be set to the temperature-sustaining input power Wc1 for the positive power demand P*, while set to the reference input limit Bwin for the negative power demand P*.

While the engine 22 operates, the hybrid vehicle 20 of the embodiment basically sets the output limit Swout to the accelerator opening-based output limit Wacc, which depends on the accelerator opening Acc. One possible modification may set a fixed value, for example, the temperature-sustaining output power Wc2, to the output limit Swout, independently of the accelerator opening Acc. The fixed value is not restricted to the temperature-sustaining output power Wc2 but may be greater than or smaller than the temperature-sustaining output power Wc2. The accelerator opening-based output limit Wacc may be set to the temperature-sustaining output power Wc2 for the accelerator opening Acc of not greater than the middle opening A1%, while set to the reference output limit Bwout or the temporary maximum output power Wmax for the accelerator opening Acc of greater than the middle opening A1%.

During the operation of the engine 22, the hybrid vehicle 20 of the embodiment basically sets the input limit Swin to the power demand-based input limit Wp*, which depends on the power demand P*. The input limit Swin may be set to the power demand-based input limit Wp*, which depends upon both the power demand P* and the vehicle speed V. During the operation of the engine 22, the hybrid vehicle 20 of the embodiment basically sets the output limit Swout to the accelerator opening-based output limit Wacc, which depends on the accelerator opening Acc. The output limit Swout may be set the accelerator opening-based output limit Wacc, which depends upon both the accelerator opening Acc and the vehicle speed V. Namely the power demand-based input limit Wp* and the accelerator opening-based output limit Wacc may have the vehicle speed dependency.

In response to the onset of the stricter limitation of the input and the output of the battery 50, the hybrid vehicle 20 of the embodiment corrects the input limit Swin and the output limit Swout by addition and subtraction of the preset correction value $\Delta S1$, in order to prevent the abrupt changes of the input limit Swin and the output limit Swout. Such correction may be omitted from the control procedure, when not required.

The hybrid vehicle 20 of the embodiment corrects the output limit Swout by addition of the temporary output increase Bi at a start of the engine 22. Such correction may be omitted from the control procedure, when not required.

In the hybrid vehicle 20 of the embodiment, the transmission 60 is designed to change the gear between the two speeds, Hi and Lo. The transmission is, however, not restricted to two speeds, but may have three or more speeds. In the configuration of the hybrid vehicle 20 of the embodiment, the transmission 60 is interposed between the motor MG2 and the ring gear shaft 32a. The transmission 60 may, however, be omitted from the hybrid vehicle 20 of this configuration. This modified structure does not require step S360 in the input output limit setting routine of FIG. 4.

In the hybrid vehicle 20 of the embodiment, the battery ECU 52 executes the input output limit setting routine shown in the flowchart of FIG. 4. Alternatively the hybrid electronic control unit 70 may execute the input output limit setting routine to set the input limit Swin and the output limit Swout.

Figure 14:
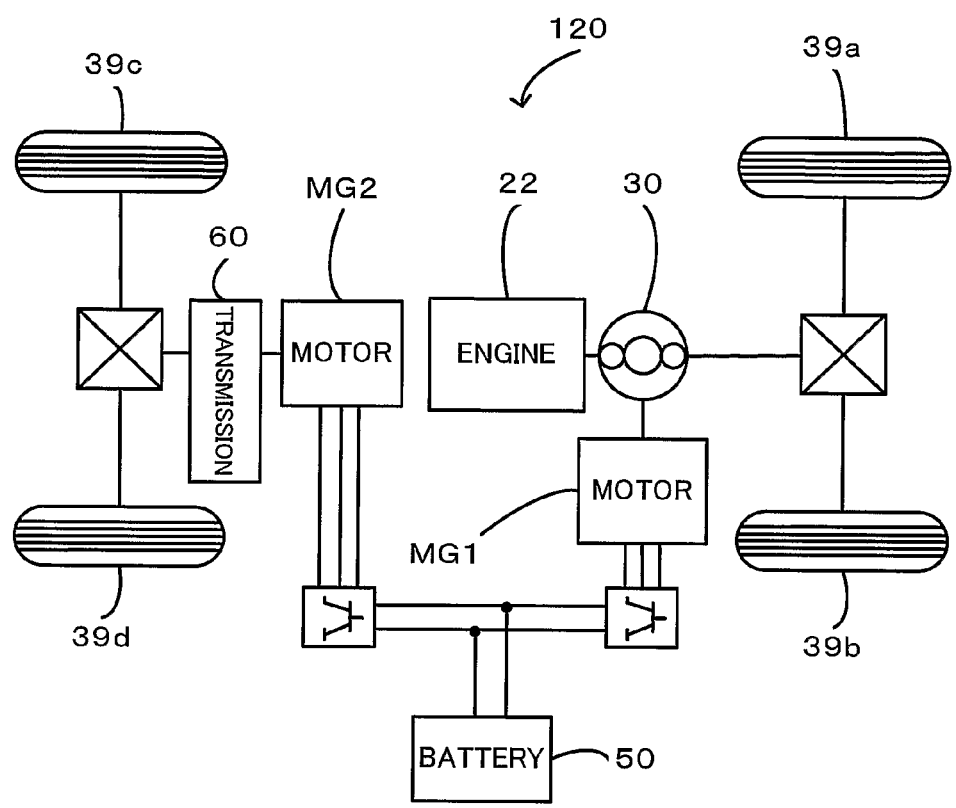
FIG. 14 schematically illustrates the configuration of another hybrid vehicle in one modified example of the invention.

In the hybrid vehicle 20 of the embodiment, the power of the motor MG2 goes through the gear change of the transmission 60 and is output to the ring gear shaft 32a. The technique of the invention is, however, not restricted to this configuration but is also applicable to a hybrid vehicle 120 of one modified example as shown in FIG. 14. In the hybrid vehicle 120 of this modified configuration, the power of the motor MG2 goes through the gear change of the transmission 60 and is connected to a different axle (axle linked to wheels 39c and 39d) from an axle connected with the ring gear shaft 32a (axle linked to the drive wheels 39a and 39b). The transmission 60 may be omitted from the hybrid vehicle 120 of this modified configuration.

Figure 15:
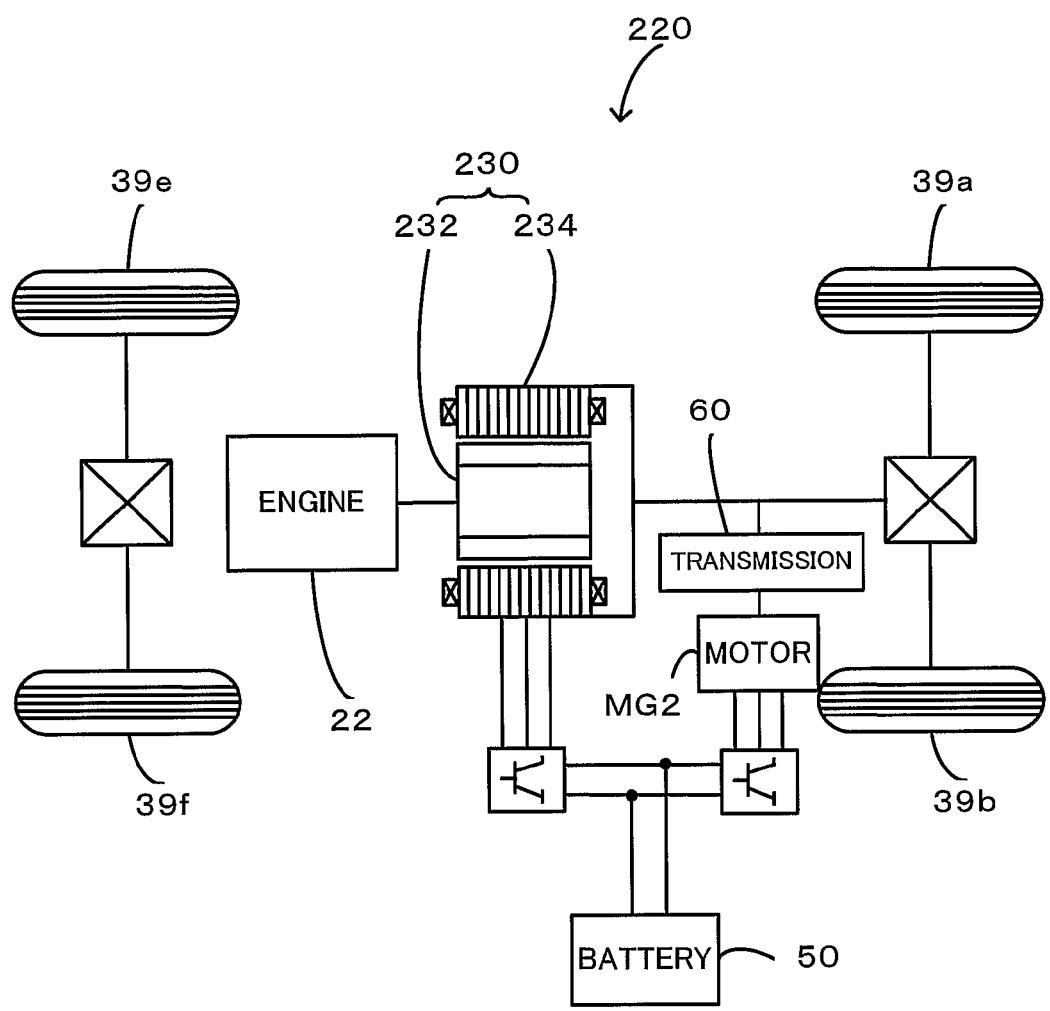
FIG. 15 schematically illustrates the configuration of another hybrid vehicle in one modified example of the invention

In the hybrid vehicle 20 of the embodiment, the power of the engine 22 is output via the power distribution integration mechanism 30 to the ring gear shaft 32a or the drive shaft linked to the drive wheels 39a and 39b. The technique of the invention is, however, not restricted to this configuration but is also applicable to a hybrid vehicle 220 of another modified example as shown in FIG. 15. The hybrid vehicle 220 of this modified configuration includes a pair-rotor motor 230 that includes an inner rotor 232 connected to a crankshaft of the engine 22 and an outer rotor 234 connected to a drive shaft to output power to the drive wheels 39a and 39b. The pair-rotor motor 230 transmits part of the output power of the engine 22 to the drive shaft, while converting residual part of the output power into electric power. The transmission 60 may be omitted from the hybrid vehicle 220 of this modified configuration.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is applicable to manufacturing industries of power output apparatuses and motor vehicles.

The invention claimed is:

1. A power output apparatus that outputs power to a drive shaft, said power output apparatus comprising:
   an internal combustion engine;
   a power conversion mechanism that converts at least part of output power of the internal combustion engine into electric power;
   a motor that outputs power to the drive shaft;
   an accumulator unit that transmits electric power to and from the power conversion mechanism and the motor;
   an input output limit setting module that sets at least either of an input limit and an output limit of the accumulator unit, as a lower limit and an upper limit of an allowable electric power range input from and output to the accumulator unit, based on an operation or a stop of the internal combustion engine, the limit setting occurring after a determination is made as to whether the engine is operating or stopped;
   a power demand specification module that specifies a power demand to be output to the drive shaft; and
   a control module that controls the internal combustion engine, the power conversion mechanism, and the motor to output a required power corresponding to the specified power demand to the drive shaft while keeping the input from and the output to the accumulator unit within the input limit and the output limit of the accumulator unit,
   wherein said input output limit setting module sets at least either of the input limit and the output limit to narrow the allowable electric power range during an operation of the internal combustion engine, compared with the allowable electric power range during a stop of the internal combustion engine.

2. A power output apparatus in accordance with claim 1, wherein said input output limit setting module sets at least either of the input limit and the output limit according to an observed condition of the accumulator unit during a stop of the internal combustion engine,
   said input output limit setting module setting at least either of the input limit and the output limit during an operation of the internal combustion engine to keep temperature of the accumulator unit at or below a preset reference level within an allowable temperature range under the condition of continuous charge or continuous discharge of the accumulator unit.

3. A power output apparatus in accordance with claim 1, wherein said input output limit setting module sets at least either of the input limit and the output limit on the assumption of a stop of the internal combustion engine until elapse of a preset time period from a start of the internal combustion engine.

4. A power output apparatus in accordance with claim 1, wherein when the drive shaft is under braking during an operation of the internal combustion engine, said input output limit setting module sets at least either of the input limit and the output limit on the assumption of a stop of the internal combustion engine.

5. A power output apparatus in accordance with claim 1, wherein when the drive shaft is under braking during an operation of the internal combustion engine, said input output limit setting module sets at least either of the input limit and the output limit according to a braking state of the drive shaft.

6. A power output apparatus in accordance with claim 1, wherein when an exhaust conversion unit of the internal combustion engine is warmed up during an operation of the internal combustion engine, said input output limit setting module sets at least either of the input limit and the output limit on the assumption of a stop of the internal combustion engine.

7. A power output apparatus in accordance with claim 1, said power output apparatus further comprising:
   an accelerator operation detection unit that detects an operator's accelerator operation,
   wherein said power demand specification module specifies the power demand corresponding to the accelerator operation detected by the accelerator operation detection unit, and
   when the accelerator operation detected by the accelerator operation detection unit during an operation of the internal combustion engine is not less than a preset level, said input output limit setting module sets at least either of the input limit and the output limit according to the detected accelerator operation.

8. A power output apparatus in accordance with claim 7, wherein said input output limit setting module sets at least either of the input limit and the output limit to widen the allowable electric power range with an increase in level of the detected accelerator operation.

9. A power output apparatus in accordance with claim 1, wherein said input output limit setting module sets at least either of the input limit and the output limit during an operation of the internal combustion engine to widen the allowable electric power range with an increase in specified power demand.

10. A power output apparatus in accordance with claim 1, wherein said input output limit setting module sets at least either of the input limit and the output limit to narrow the allowable electric power range and to attain a smooth time variation of the allowable electric power range.

11. A power output apparatus in accordance with claim 1, said power output apparatus further comprising:
    a transmission unit that is connected to a rotating shaft of the motor and to the drive shaft and transmits output power of the rotating shaft of the motor to the drive shaft at a variable change gear ratio,
    wherein when the change gear ratio of the transmission unit is varied during an operation of the internal combustion engine, said input output limit setting module sets at least either of the input limit and the output limit on the assumption of a stop of the internal combustion engine.

12. A power output apparatus in accordance with claim 1, wherein the power conversion mechanism is connected to an output shaft of the internal combustion engine and to the drive shaft and outputs at least part of output power from the internal combustion engine to the drive shaft through input and output of mechanical power and electric power.

13. A power output apparatus in accordance with claim 1, wherein the power conversion mechanism comprises:
   a three shaft-type power input output module that is linked to three shafts, that is, an output shaft of the internal combustion engine, the drive shaft, and a rotating shaft, and automatically determines power input from and output to a residual one shaft based on powers input from and output to any two shafts among the three shafts; and
   a generator that inputs and outputs power from and to the rotating shaft.

14. A power output apparatus in accordance with claim 1, the power conversion mechanism comprises a pair-rotor motor that has a first rotor linked to an output shaft of the internal combustion engine and a second rotor linked to the drive shaft and is driven by relative rotation of the first rotor to the second rotor.

15. A control method of a power output apparatus, which includes an internal combustion engine, a power conversion mechanism that converts at least part of output power of the internal combustion engine into electric power, a motor that outputs power to a drive shaft, and an accumulator unit that transmits electric power to and from the power conversion mechanism and the motor,
   said control method comprising the steps of:
   (a) setting at least either of an input limit and an output limit of the accumulator unit, as a lower limit and an upper limit of an allowable electric power range input from and output to the accumulator unit, based on an operation or a stop of the internal combustion engine;
   (b) specifying a power demand to be output to the drive shaft; and
   (c) controlling the internal combustion engine, the power conversion mechanism, and the motor to output a required power corresponding to the specified power demand to the drive shaft while keeping the input from and the output to the accumulator unit within the input limit and the output limit of the accumulator unit,
   wherein the setting step occurs after a determination is made as to whether the engine is operating or stopped.

16. A control method in accordance with claim 15, wherein said step (a) sets at least either of the input limit and the output limit to narrow the allowable electric power range during an operation of the internal combustion engine, compared with the allowable electric power range during a stop of the internal combustion engine.

17. A hybrid vehicle having an axle linked to a drive shaft, said hybrid vehicle comprising:
   an internal combustion engine;
   a power conversion mechanism that converts at least part of output power of the internal combustion engine into electric power;
   a motor that outputs power to the drive shaft;
   an accumulator unit that transmits electric power to and from the power conversion mechanism and the motor;
   an input output limit setting module that sets at least either of an input limit and an output limit of the accumulator unit, as a lower limit and an upper limit of an allowable electric power range input from and output to the accumulator unit, based on an operation or a stop of the internal combustion engine, the limit setting occurring after a determination is made as to whether the engine is operating or stopped;
   a power demand specification module that specifies a power demand to be output to the drive shaft; and
   a control module that controls the internal combustion engine, the power conversion mechanism, and the motor to output a required power corresponding to the specified power demand to the drive shaft while keeping the input from and the output to the accumulator unit within the input limit and the output limit of the accumulator unit.

* * * * *